(12) United States Patent
Caldwell et al.

(10) Patent No.: US 11,321,856 B1
(45) Date of Patent: May 3, 2022

(54) DETECTION OF INAUTHENTIC VIRTUAL OBJECTS

(71) Applicant: Roblox Corporation, San Mateo, CA (US)

(72) Inventors: Courtland R. Caldwell, Millbrae, CA (US); Robin E. Mayes, San Francisco, CA (US); Rebecca L. Herndon, San Francisco, CA (US); Hariharan Natarajan, Fremont, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/127,714

(22) Filed: Dec. 18, 2020

(51) Int. Cl.
| G06T 7/40 | (2017.01) |
| G06T 15/04 | (2011.01) |
| G06K 9/62 | (2006.01) |
| G06K 9/00 | (2006.01) |
| G06K 9/36 | (2006.01) |

(52) U.S. Cl.
CPC ............. *G06T 7/40* (2013.01); *G06T 15/04* (2013.01)

(58) Field of Classification Search
CPC combination set(s) only.
See application file for complete search history.

(56) References Cited

U.S. PATENT DOCUMENTS

| 2007/0183669 | A1 | 8/2007 | Owechko et al. | |
| 2013/0034337 | A1* | 2/2013 | Hefeeda | H04N 5/913 386/252 |
| 2013/0124359 | A1 | 5/2013 | Hedges et al. | |
| 2014/0139647 | A1 | 5/2014 | Nagatani | |
| 2015/0071486 | A1 | 3/2015 | Rhoads et al. | |
| 2016/0221114 | A1 | 8/2016 | Dietrich | |
| 2017/0372516 | A1 | 12/2017 | Evans | |
| 2020/0035011 | A1 | 1/2020 | Bilgili | |

(Continued)

FOREIGN PATENT DOCUMENTS

| WO | 2014081394 | 5/2014 |
| WO | 2019207170 | 10/2019 |

OTHER PUBLICATIONS

Bjelland, et al., "Practical use of Approximate Hash Based Marching in digital investigations", Digital Investigation, vol. 11, Supp. 1, May 2014, pp. S18-S26.

(Continued)

*Primary Examiner* — Wesner Sajous
(74) *Attorney, Agent, or Firm* — IP Spring

(57) ABSTRACT

Some implementations relate to methods and computer-readable media to detect inauthentic textures in a virtual environment. In some implementations, a method includes receiving a plurality of two-dimensional (2D) polygons associated with a texture for a three-dimensional (3D) virtual object. The method further includes combining portions of two or more 2D polygons from the plurality of 2D polygons based on a pose or shape of the 3D virtual object to obtain one or more combined 2D polygons, calculating a respective hash value for each of the combined 2D polygons, determining whether there is a match between at least one hash value of the respective hash values and a hash value of at least one reference 2D polygon associated with an authentic object, classifying the texture as an inauthentic texture if it is determined that there is the match, else classifying the texture as an authentic texture.

20 Claims, 9 Drawing Sheets

(56) References Cited

U.S. PATENT DOCUMENTS

2020/0167995 A1    5/2020  Hare et al.
2020/0175001 A1*   6/2020  Malan .................... G06Q 20/02
2021/0174132 A1*   6/2021  Mayes ............... G06K 9/00208

OTHER PUBLICATIONS

Huang, et al., "An Accurate Method for Voxelizing Polygon Meshes", IEEE Symposium on Volume Visualization (Cat. No 989EX300), 1998, 9 pages.
Jones, "The Production of Volume Data from Triangular Meshes Using Voxelisation", Computer Graphics Forum, vol. 15, No. 5, Dec. 1996, pp. 311-318.
Zauner, "Implementation and Benchmarking of Perceptual Image Hash Functions", Sichere Informationssysteme, Hagenberg, 2010, 107 pages.
WIPO, International Search Report for International Patent Application No. PCT/US2019/067929, dated Mar. 18, 2020, 2 pages.
WIPO, Written Opinion for International Patent Application No. PCT/US2019/067929, dated Mar. 18, 2020, 8 pages.
USPTO, Non-final Office Action for U.S. Appl. No. 16/703,823, dated Jun. 22, 2021, 15 pages.
USPTO, Notice of Allowance for U.S. Appl. No. 16/703,823, dated Sep. 28, 2021, 7 pages.
USPTO, International Search Report for International Patent Application No. PCT/US2021/063394, dated Jan. 13, 2022, 2 pages.
USPTO, Written Opinion for International Patent Application No. PCT/US2021/063394, dated Jan. 13, 2022, 4 pages.

* cited by examiner

US 11,321,856 B1

DETECTION OF INAUTHENTIC VIRTUAL OBJECTS

Implementations relate generally to computer-based gaming, and more particularly, to methods, systems, and computer readable media for detection of inauthentic virtual objects.

BACKGROUND

Some online platforms (e.g., gaming platforms, media exchange platforms, etc.), allow users to connect with each other, interact with each other (e.g., within a game), create games, and share information with each other via the Internet. Users of online gaming platforms may participate in multiplayer gaming environments or virtual environments (e.g., three-dimensional environments), design custom gaming environments, design characters and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

In order to prevent inauthentic objects from being featured on the gaming platform, a need may exist for a computationally efficient method to detect inauthentic virtual objects, by comparison with genuine virtual objects.

Some implementations were conceived in light of the above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to detect inauthentic textures in a virtual environment. The computer-implemented method also includes receiving a plurality of two-dimensional (2D) polygons associated with a texture for a three-dimensional (3D) virtual object; combining portions of two or more 2D polygons from the plurality of 2D polygons based on a pose or shape of the 3D virtual object to obtain one or more combined 2D polygons; calculating a respective hash value for each of the combined 2D polygons; determining whether there is a match between at least one hash value of the respective hash values and a hash value of at least one reference 2D polygon associated with an authentic object; if it is determined that there is the match, classifying the texture as an inauthentic texture; and if it is determined that there is no match, classifying the texture as an authentic texture. Other embodiments of this aspect include corresponding computer systems, apparatus, and computer programs recorded on one or more computer storage devices, each configured to perform the actions of the methods.

Implementations may include one or more of the following features. The computer-implemented method where receiving the plurality of 2D polygons may include receiving a plurality of 2D polygons that include a set of 2D polygons that conform to a predetermined set of dimensions and are combinable based on a predetermined template to generate a texture for the 3D virtual object. The 3D virtual object is a clothing item associated with a virtual avatar. Combining the two or more 2D polygons is based on an overlay arrangement of the two or more 2D polygons, and where at least one of the two or more 2D polygons has a transparency that meets a threshold transparency. Determining whether there is the match may include calculating a match score associated with the match between each of the respective hash values and the hash value of the reference 2D polygon associated with the authentic object; and determining that there is the match if the match score meets a threshold. The computer-implemented method may include applying a weight associated with the combined portion of the two or more 2D polygons to the match score. Combining portions of the two or more 2D polygons is based on an ordered list of 2D polygons. The one or animations correspond to movement of the 3D virtual object in the virtual environment. The ordered list of 2D polygons is based on one or more deformations of the 3D virtual object. The computer-implemented method may include, prior to the combining: classifying the texture as the inauthentic texture if a hash value of at least one of the plurality of two-dimensional (2D) polygons associated with the texture for the 3D virtual object matches the hash value of the reference 2D polygon associated with the authentic object. Calculating a respective hash value may include calculating the respective hash value using a perceptual hashing technique, where hash values for polygons that have similar content bear greater similarity than hash values for polygons that have dissimilar content. The computer-implemented method may include providing a user interface that includes the authentic texture in a virtual environment. The 3D virtual object is an object that can be worn by a virtual avatar in the virtual environment. Implementations of the described techniques may include hardware, a method or process, or computer software on a computer-accessible medium.

One general aspect includes a non-transitory computer-readable medium may include instructions that. The non-transitory computer-readable medium also includes receiving a plurality of two-dimensional (2D) polygons associated with a texture for a three-dimensional (3D) virtual object; combining portions of two or more 2D polygons from the plurality of 2D polygons based on a pose or shape of the 3D virtual object to obtain one or more combined 2D polygons; calculating a respective hash value for each of the combined polygons; determining whether there is a match between at least one hash value of the respective hash values and a hash value of at least one reference 2D polygon associated with an authentic object; if it is determined that there is the match, classifying the texture as an inauthentic texture; and if it is determined that there is no match, classifying the texture as an authentic texture. Other embodiments of this aspect include corresponding computer systems, apparatus, and computer programs recorded on one or more computer storage devices, each configured to perform the actions of the methods.

Implementations may include one or more of the following features. The non-transitory computer-readable medium where combining portions of the two or more 2D polygons is based on an ordered list of 2D polygons. The operations further may include determining the ordered list of 2D polygons based on one or more animations in a virtual environment in which the 3D virtual object is placed, and where the one or animations correspond to movement of the 3D virtual object in the virtual environment. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving a plurality of two-dimensional (2D) polygons associated with a texture for a three-dimensional (3D) virtual object; combining portions of two or more 2D polygons from the plurality of 2D polygons based on a pose or shape of the 3D virtual object to obtain one or more combined 2D polygons; calculating a respective hash value for each of the combined polygons; determining whether there is a match between at least one hash value of the respective hash values and a hash value of at least one reference 2D polygon associated with an authentic object; if it is determined that there is the match, classifying the texture as an inauthentic texture; and if it is determined that there is no match, classifying the texture as an authentic texture. Other embodiments of this aspect include corresponding computer systems, apparatus, and computer programs recorded on one or more computer storage devices, each configured to perform the actions of the methods.

Implementations may include one or more of the following features. The system where combining portions of the two or more 2D polygons is based on an ordered list of 2D polygons. The ordered list of 2D polygons is based on one or more deformations of the 3D virtual object. Calculating a respective hash value may include calculating the respective hash value using a perceptual hashing technique, where hash values for polygons that have similar content bear greater similarity than hash values for polygons that have dissimilar content. Implementations of the described techniques may include hardware, a method or process, or computer software on a computer-accessible medium.

DETAILED DESCRIPTION

Figure 1:
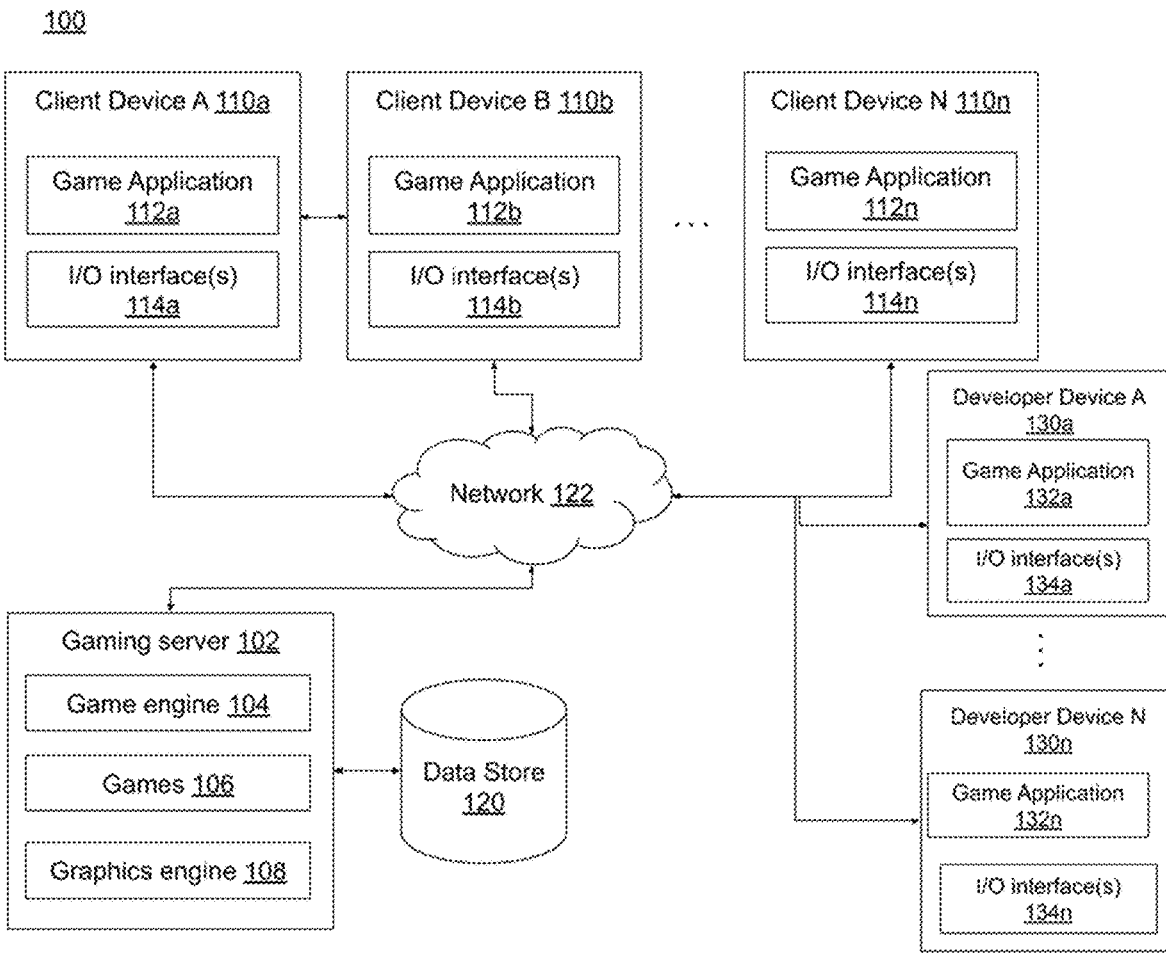
FIG. 1 is a diagram of an example system architecture for detection of inauthentic virtual objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users (developers) of the platform to create new games and/or characters. For example, users of the online gaming platform may be enabled to create, design, and/or customize new characters (avatars), new animation packages, and make them available to other users.

In some cases, the online gaming platform may provide tools to enable users to create new characters, virtual objects, accessories, etc. In some implementations, the gaming platform may provide options for users to create and/or distribute virtual objects.

In some implementations, a templatized tool may be provided to users to enable users to quickly create virtual objects for certain categories of objects and/or accessories.

New characters and animation packages (virtual objects) may be traded, bartered, or bought and sold in online marketplaces for virtual and/or real currency. The virtual objects may be copied and redistributed without the reseller's or purchaser's awareness of the counterfeit nature of the virtual object(s). In some cases, virtual objects may include images that are copyrighted. In some cases, the virtual objects may include objectionable and inappropriate content.

Flooding of counterfeit and inauthentic virtual objects in the marketplace can be difficult to detect, and the volume and nature of the virtual objects can make it difficult for human intervention in the detection of the counterfeit and inauthentic virtual objects.

An objective of a game platform owner or administrator is the mitigation of inauthentic (counterfeit) and/or objectionable objects and provide an incentive to creators of original content. A technical problem for online gaming platform operators is the detection of inauthentic virtual objects across the online gaming platform(s).

Early detection of inauthentic virtual objects may make it difficult and/or expensive for a creator of an inauthentic virtual object to create and propagate inauthentic virtual objects. A game platform that prevents the upload of inauthentic virtual objects can effectively deter inauthentic object creators.

In order to circumvent detection, creators can sometimes manipulate an original virtual object to create a manipulated object. The manipulated object may be classified by some inauthentic detection techniques as original, even though the difference between the manipulated object and the genuine object may not be perceptible.

Partial images can infringe logos or other proprietary property, and escape detection by conventional image matching techniques by being configured to go across edges of the template polygons, e.g., rectangles, or to be visible in certain deformations of a virtual character that occur in specific poses of the avatar. The counterfeit (inauthentic) object may be distributed over portions of a 3D virtual object such that it is not easily detectable in its original state, but is viewable in certain deformations, poses and/or animation sequences of the 3D virtual object in a virtual environment. In some instances, the counterfeit (inauthentic) object may be distributed over portions of multiple 3D virtual objects such that it is not easily detectable in its original state, but is viewable in certain poses and/or animation sequences when the multiple 3D virtual objects are combined, e.g., by draping on a virtual avatar, or when undergoing deformation or bone rigging, in a virtual environment.

The present disclosure addresses the above-described drawbacks by detecting inauthentic objects that are similar to authentic (genuine) objects that are known to the game platform. The similarity of the inauthentic (counterfeit) virtual object to an original virtual object (perceptual hash matching) is utilized for the detection of inauthentic objects.

Perceptual hash matching utilizes perceptual hash functions that are fingerprints of multimedia files (image files, audio files, video files, etc.) derived from various features from its content. Perceptual hashes of two files are close to one another if their underlying features are similar. Perceptual hash functions are designed to be robust to take into account transformations (rotation, skew, contrast adjustment, use of different compression/formats of a file, etc.) of a file and yet detect the transformed file as being similar to the original file.

Implementations are described herein to automatically detect inauthentic objects on a game platform. Further, the implementations may be designed such that they offer performance that is better than linear in scale when compared to a number of comparable virtual objects.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. In some implementations, the graphics engine 108 may be a system, application, or module that permits the online gaming server 102 to provide graphics and animation capability. In some implementations, the graphics engine 108 may perform one or more of the operations described below in connection with the flowchart shown in FIG. 6. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a web page) or application back-end software that may be used to provide a user with access to content provided by online gaming server 102. For example, users may access online gaming server 102 using the game application 112 on client devices 110.

In some implementations, gameplay session data are generated via online gaming server 102, game application 112, and/or game application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment; accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to as a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associate the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the game 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online gaming platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming server 102. In some implementations, creating, modifying, or customizing characters, other game objects, games 106, or game environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

Figure 2:
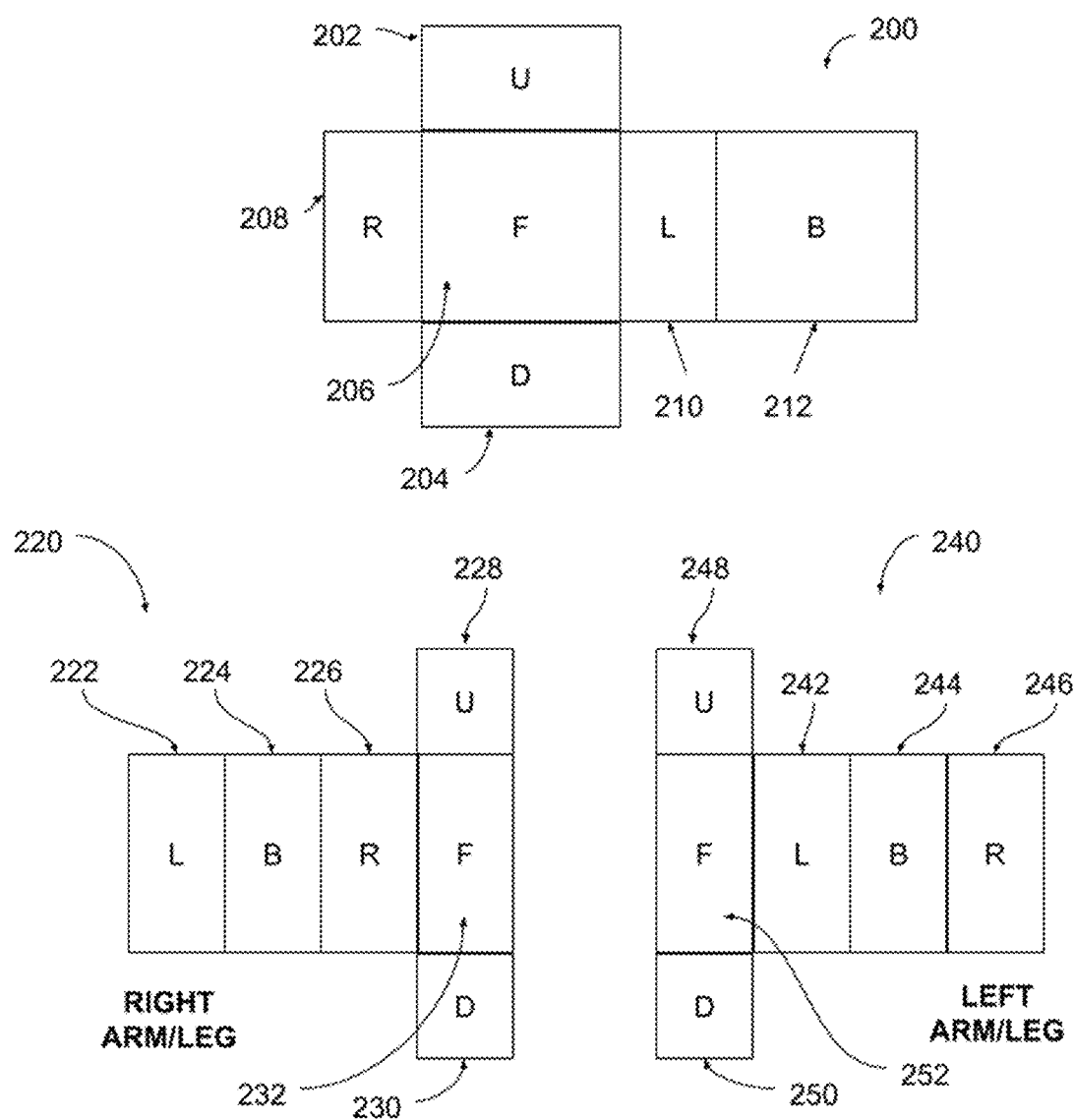
FIG. 2 depicts example templates utilized to create/generate virtual objects, in accordance with some implementations.

FIG. 2 depicts example templates 200, 220, and 240 that may be utilized to generate virtual objects, in accordance with some implementations. The example template may be utilized by users to create virtual objects, such as avatars (e.g., humanoid characters), accessories (e.g., clothing, footwear, headgear, etc.) etc. for use in a virtual environment.

In some implementations, the example template may specify a set of 2D polygons that conform to a predetermined set of dimensions and are combinable based on a predetermined template to generate a texture for the 3D virtual object.

In some implementations, templates 200, 220, and 240 may be a graphical template stored on online gaming server 102 (for example, in datastore 120), on one or more of client devices 110, and/or developer devices 130. In some implementations, templates 200 and 220 may be rendered on any of client devices 110 or developer devices 130 by game engine 104.

In some implementations, templates 200, 220, and 240 may be provided to a user, e.g., to a developer via a graphical user interface of the online gaming platform that enables the user to view and/or design different 3D virtual objects. In some implementations, a template includes a plurality of 2D polygons that correspond to different views and/or surfaces associated with a 3D virtual object.

Users (developers) may edit and create 3D virtual objects based on the template, e.g. using photo editor tools, by adding images, art work, text, other design elements, etc. to the template. In some implementations, a user may open the template in an image editor on a local user device, e.g. client device 110 or developer device 130 and create a new 3D virtual object by editing a texture associated with any of the 2D polygons of the template in the image editor.

In some implementations, each template may correspond to a particular body portion of a virtual avatar in the virtual environment. For example, a torso portion may correspond to the torso of an avatar, a left portion may correspond to a left arm/leg, and a right portion may correspond to a right arm/leg. However, it may be permissible, in certain instances, for portions that correspond to one body part (e.g., torso) to be draped on a different body part (e.g., head). In such instances, the draping may be imperfect, e.g., portions of the template may be disregarded (e.g., not displayed) while rendering the virtual avatar.

As depicted in FIG. 2, template 200 is a template that is utilized to create a 3D virtual object, e.g. an accessory such as a shirt or a pant for a virtual avatar in a virtual environment. In some implementations, template 200 includes 2D polygons that are representative of different portions of the 3D virtual object. In this illustrative example, template 200 may be utilized to design a torso portion of a 3D virtual object, e.g., a shirt associated with a virtual avatar. For example, template 200 includes an upper (top) portion 202 denoted by U, a down (bottom) portion 204 denoted by D, a front portion 206 denoted by F, a right portion 208 denoted by R, a left portion 210 denoted by L, and a back (rear) portion 212 denoted by B. Template 200 may be provided for use as a guide to design 3D virtual objects, e.g. clothing accessories, for use within a virtual environment provided by an online gaming platform.

In some implementations, template 200 may include gridlines that may be utilized to guide user design within the template 200. In some implementations, template 200 may include reference coordinates that enable precise definition of points and regions within the template.

Templates 220 and 240 may be utilized to design an arm or leg portion of a 3D virtual object, e.g. a pant or a shirt for a virtual avatar in a virtual environment.

In some implementations, template 220 may be utilized to create a right arm or leg portion of a 3D virtual object. Template 220 includes a left portion 222 denoted by L, a back (rear) portion 224 denoted by B, a right portion 226 denoted by R, an up portion 228 denoted by U, a front portion 232 denoted by F, and a down (bottom) portion 230 denoted by D.

In some implementations, template 240 may be utilized to create a left arm or leg portion of a 3D virtual object. Template 240 includes a left portion 242 denoted by L, a back (rear) portion 244 denoted by B, a right portion 246 denoted by R, an up portion 248 denoted by U, a front portion 252 denoted by F, and a down (bottom) portion 250 denoted by D.

In some implementations, one or more additional features may be included in templates 200, 220, and 240. For example, pre-designed images or features may be included in the templates that a user can utilize as part of their designs.

In some implementations, markings may be provided on the templates to indicate regions of overlap with other 3D virtual objects such as shoes, hats, etc. when the template is draped on a virtual avatar together with such 3D virtual objects.

In some implementations, the texture may indicate color and/or pattern of an outer surface of the virtual 3D object. The texture may have properties that can include transparency (varying degrees from fully transparent to fully opaque), reflectiveness (how virtual light reflects off the texture), degrees of diffusivity to incident light within the virtual environment, material properties (e.g., how the texture stretches, folds, creases, etc. when the virtual avatar on which the 3D object is draped has different shapes and/or poses) and refractive properties of the textures and meshes associated with the virtual 3D object. Some examples of textures include grass, a pane of light blue glass, ice, water, concrete, brick, carpet, wood, etc. The virtual environment may permit other synthetic textures that do not exist in the real world, e.g., ice that creases, bricks that can bend, etc.

In some implementations, a size may be specified for one or more of the 2D polygons. For example, in some implementations, the front portion 206 and back portion of the torso may have a size of 128×128 pixels. The top (upper) portion of the torso and bottom (down) portion of the torso may have a size of 128×64 pixels. In some implementations, the top and bottom portions of arms and legs may have a size of 64×64 pixels. In some implementations, the sides of the torso and arms/legs may have a size of 64×128 pixels.

Figure 3:
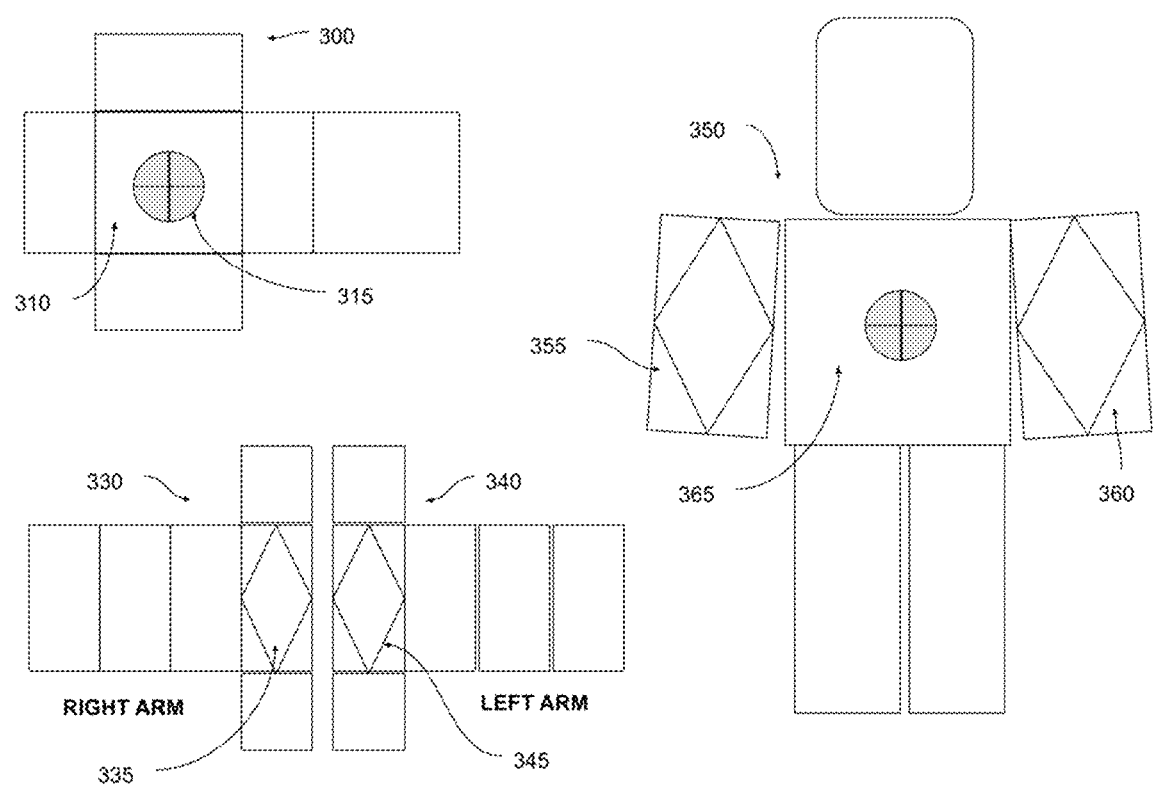
FIG. 3 illustrates an example 3D virtual object created using templates, in accordance with some implementations.

FIG. 3 illustrates an example 3D virtual object created using templates, in accordance with some implementations.

In different implementations, the templates may be utilized to create a composite 3D virtual object that can be used as an accessory, e.g. a clothing item for a virtual avatar.

In some implementations, the template may be stored in a storage device and/or a memory (for example, in datastore 120 or on client devices 110 or on developer devices 130). The templates may enable a user to depict particular features of a 3D virtual object. Users of developer devices 130 may be provided with a user interface that enables design of the accessory, e.g., using game application 132.

FIG. 3 depicts an example 3D virtual object created using templates, in accordance with some implementations.

In some implementations, 2D polygons in the template are folded up and/or wrapped around a virtual avatar's (character's) torso, arms, and/or legs. The contents, e.g., images, etc. included in each 2D polygon are utilized to generate a 3D virtual object. A texture of corresponding surfaces (sides) of the 3D virtual object is generated by combining the plurality of 2D polygons in a specific arrangement based on a shape and/or a pose of the 3D virtual object, which in turn may be based on a shape and/or pose of a virtual avatar that the 3D virtual object is attached to.

In some implementations, the shape of the 3D virtual object is associated with a shape of an underlying virtual object, wherein the body parts of a character (avatar) may be connected by a mesh that provides a definition for a shape of the character.

This illustrative example depicts a shirt 350 for a virtual avatar, a texture for which is created using a template 300 for a torso portion, a template 330 for a right arm portion and a template 340 for a left arm portion. As depicted in FIG. 3, the texture data from 2D polygons in templates 300, 330, and 340 are combined to generate a 3D virtual object, a shirt 350 associated with a virtual avatar (character). As depicted in FIG. 4 designs (images) included in the 2D polygons are utilized to generate the shirt that includes the designs mapped to corresponding locations on the shirt as worn by an avatar.

Specifically, the front of the shirt 365 includes the design 315 from torso template 2D polygon 310, and the arms 355 and 360 of the shirt include corresponding designs from the right arm front 2D polygons 335 and the left arm front 2D polygon 345.

The virtual 3D object is rendered (for example, by graphics engine 108) by gaming server 102. In some implementations, the rendering leads to generation of one or more image(s) based on a 3D model of the virtual 3D object. In some implementations, the rendering may be performed at a resolution different from a resolution specified in a template file.

As can be seen from FIG. 3, templates 300, 330, and 340 are attached to (folded up and/or wrapped around) a virtual avatar to render the avatar as wearing shirt 350. Further, it can be appreciated that as the avatar pose changes, e.g., an arm is folded or rotated, the torso is bent or stretched, etc. corresponding deformations are automatically applied to shirt 350. For example, when the left arm is bent partially, the parallelogram on the left arm portion 360 may be squeezed accordingly. In another example, based on the material properties of the template, the parallelogram may "crease" or "rumple" to render such an effect of the shirt. In another example, if the avatar stretches the torso upward, the circular shape 315 on the front portion 365 of the shirt may get elongated into an elliptical shape.

Still further, depending on the shape of the virtual character, corresponding deformations are automatically applied to shirt 350. For example, parallelograms on the left and right arms may have different angles based on whether the virtual character is skinny or muscular, based on the defined shape of the arms for the virtual character, etc.

Figure 4A:
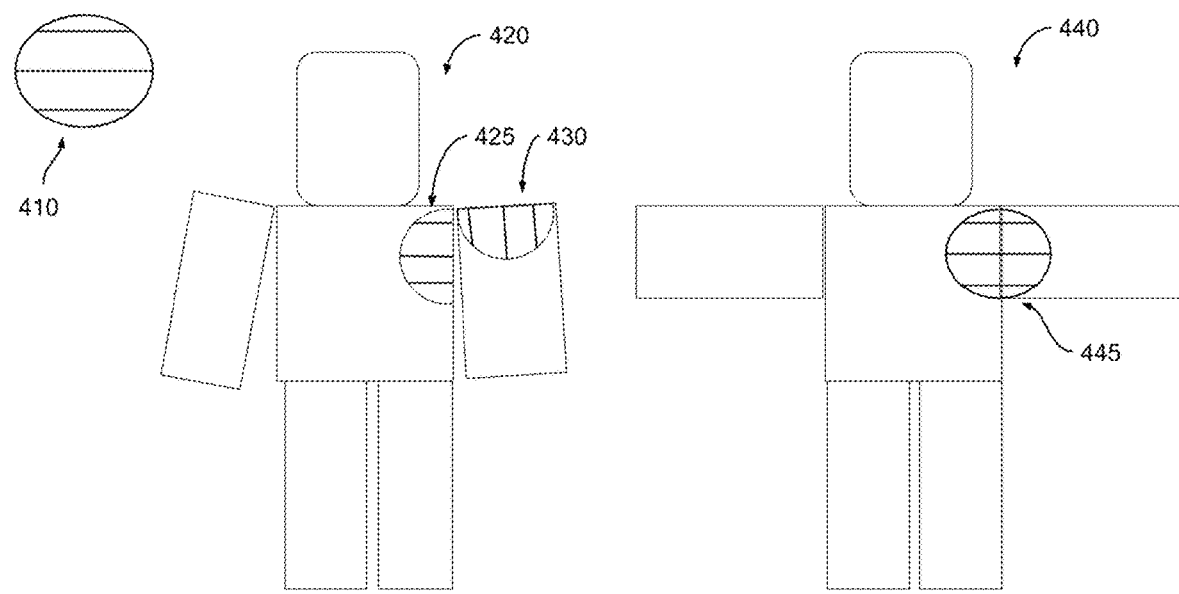
FIG. 4A illustrates views of a 3D virtual object, in accordance with some implementations.

FIG. 4A illustrates views of a 3D virtual object, in accordance with some implementations.

In some implementations, camera views in a virtual environment can lead to different views of the 3D virtual object. In some implementations, one or more camera views may be utilized by a user to view a rendered virtual 3D object.

The camera views may be provided by a virtual camera that can be positioned at different viewpoints in the 3D world to generate the camera views and to enable different views of the 3D virtual object. The position(s) and capture resolution of the virtual camera can be updated/changed as well. For example, in some implementations, the camera view may include a feature to zoom in and out, and/or capture an image of a virtual object at a higher or lower resolution.

In some implementations, movement of a virtual avatar is enabled by animation routines associated with the virtual avatar. In some implementations, a 3D virtual object associated with a virtual avatar undergoes changes (deformations) corresponding to an animation associated with the virtual avatar. For example, if the virtual avatar is animated such that it is performing a dance by movement of its head, torso, arms and legs, a 3D virtual object may also undergo corresponding changes.

In some implementations, movement of the virtual avatar is simulated by movement of a corresponding 2D or 3D object. Correspondingly, one or more 2D polygons associated with the 3D virtual object also undergoes movement and/or deformation.

Motion/movement of a virtual avatar and any associated 3D virtual objects may cause corresponding movement of any textures (designs) that are provided (e.g. draped) on the 3D virtual object. This movement can also cause changes in the position of textures on the 3D virtual object, as captured in a camera view and viewed by a user.

In some cases, users may include inappropriate and/or objectionable content (adult content, content that violates copyright, content that violates policies laid down by the game developer and/or game platform, etc.) that is not present outright in a single view or sub-view, but is distributed across different regions of an object, but which are proximate during animation or when an avatar that is wearing the object enters a particular pose, etc.

In some cases, the inappropriate content can be spread over different or multiple objects (e.g., portions of a pant and a portion of shirt, portions of 2 pants, etc.). Further, avatars can be configured to wear multiple 3D virtual objects, e.g., pants and/or shirts, portions of which may be defined by a user to be completely or partially transparent, which can be then used to include inappropriate or infringing content. For example, multiple partially transparent 3D virtual objects may be composed in the same portion of a view (slot) such that the view includes a view of inappropriate content, even when the individual constituent 3D virtual objects do not include inappropriate content.

Partial images can infringe logos or other proprietary property, and escape detection by conventional image matching techniques being configured to go across edges of the template polygons, e.g., rectangles, or to be visible in certain deformations of a virtual character that occur in specific poses of the avatar.

In some implementations, when new 3D objects are uploaded to the game platform, such objects may be verified/checked against a database of authentic objects, e.g., images, patterns, etc. All received 2D polygons associated with textures may be compared against a set of objects, e.g. reference images, previously authenticated textures, logos, etc. stored by the online gaming platform. Based on defined adjacencies, 2D polygons are combined, and an image of the combined adjacent 2D polygons is captured and compared against the stored authentic objects (e.g. reference images).

In this illustrative example, an authentic object (image) 410 is displayed that has been ascertained to be an authentic image.

The upload may be performed by providing a set of 2D polygons, e.g., variants of templates 300, 330, and 350 described with reference to FIG. 3.

FIG. 4A depicts an authentic object (image) 410, which is not permitted in the game environment. For example, authentic object 410 may be a copyrighted image, an image identified as inappropriate (e.g., an adult themed image), or otherwise identified as not permitted. FIG. 4A further depicts a 3D virtual object 420 associated with a virtual avatar that is generated based on combining provided 2D polygons based on a predefined template, e.g., a template to generate a shirt from a set of provided 2D polygons. As depicted, in a default camera view, with the virtual avatar in a standing pose 420, no violation is observed. In this pose, texture portions 425 and 430 appear on the torso and right front portion of a shirt. However, in a pose where the virtual avatar is observed to be stretching its arms (440), it is observed that the proximity of the respective torso and right front 2D polygons create a view such that a texture portion 445 is now visually similar to authentic object 410. Such a visual appearance, even if transient in nature, may not be permitted, and is therefore important to detect.

In some implementations, similarity between an authentic image and one or more views of an object in the virtual environment is detected based on a comparison of textures (images) generated from unverified sets of 2D polygons of the object with previously received authentic images. In some implementations, the comparison utilizes hash matching of the images generated by combining the unverified sets of 2D polygons in various poses and/or shapes.

In some implementations, the 2D polygons are combined based on a set of poses and movements (e.g. from animation) of the 3D virtual object and any associated virtual characters. For example, adjacent 2D polygons from the 3D virtual object may be combined and a texture generated from the combined polygons may be compared to previously received and authenticated objects (images) to detect similarity.

In some implementations, approximate hash matching (fuzzy matching, wherein matches that are less than 100% perfect are still considered as a match) is utilized to compare each of the received 2D polygons and combined 2D polygons with authentic objects to detect similar views. A hash value is computed for each image and serves as a fingerprint or watermark for the image. The hash value may be an alphanumeric value of a fixed length and/or structure and may be generated by a hash function that takes an image file as input and computes a corresponding hash value.

In some implementations, approximate hash matching techniques may be utilized to determine that the objects being compared are not identical, but are similar in that they lie within a threshold distance of each other, where the difference between corresponding hashes is a measure of their likeness. In some implementations, perceptual hash techniques may be utilized, which utilizes hash functions and thresholds that determine whether the objects (e.g. images) being compared are likely similar. For example, the perceptual hash techniques may be utilized to determine whether the objects being compared have similar features. Further, the techniques are resistant to adversarial manipulation, e.g., that attempt to pass off inauthentic objects as genuine, since the hash value of a manipulated object, e.g. an image, is similar to a hash value of an original object that was modified to generate the manipulated object.

Perceptual hash functions may be utilized to extract features of interest from the images to calculate a hash value based on the features. Perceptual hash functions may be designed such that a hash values (computed using a perceptual hash function) of an original object and an object to be authenticated are mathematically close when the objects are perceptually similar (for example, visually similar), and distant when the objects are perceptually dissimilar.

In this illustrative example, based on the comparison, it is determined that a texture associated with the virtual 3D object that corresponds to views 420 and 440 is inauthentic based on the detected similarity of texture portion 445 with authentic object 410.

Figure 4B:
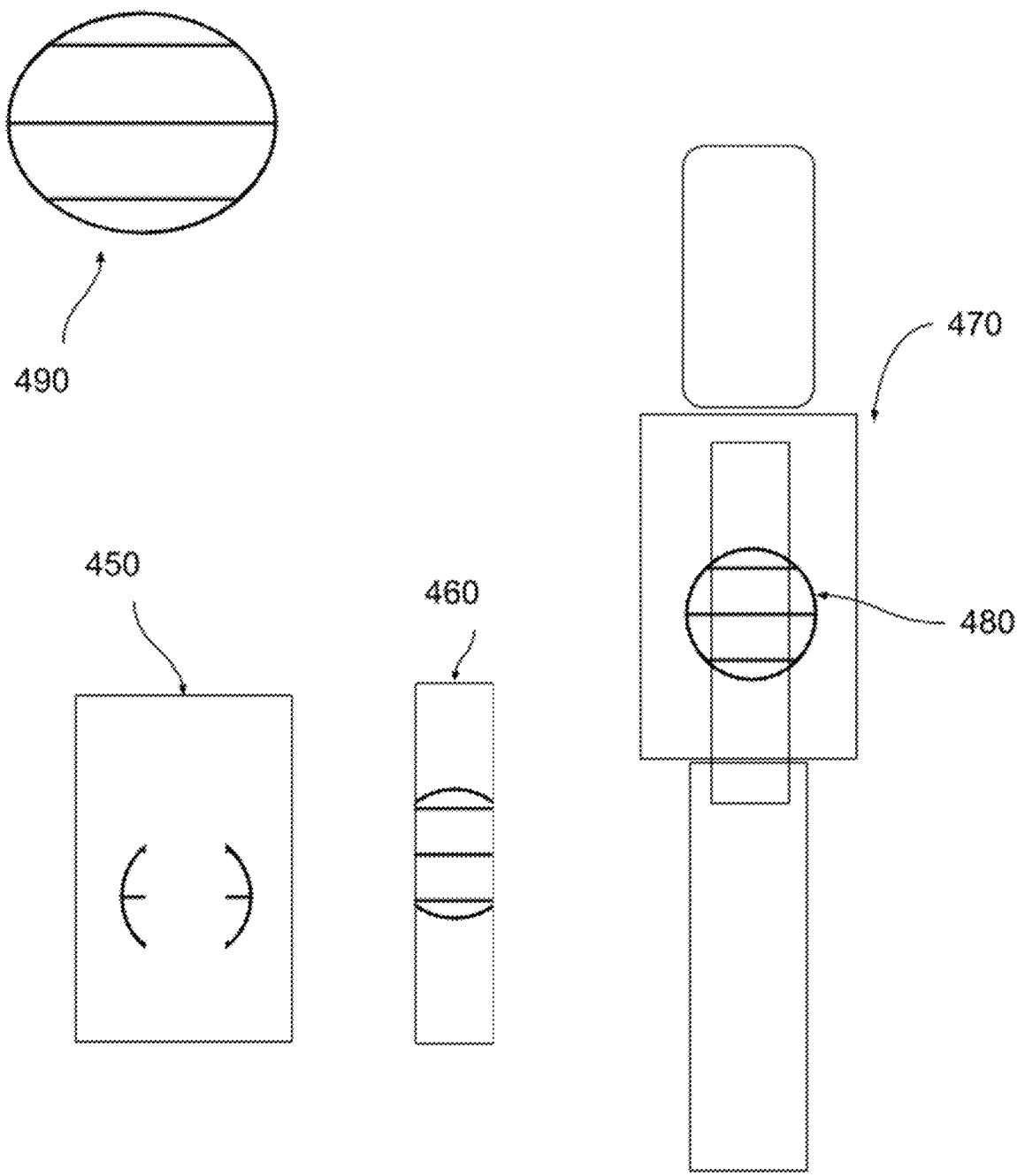
FIG. 4B illustrates views of a 3D virtual object, in accordance with some implementations.

FIG. 4B illustrates views of a 3D virtual object, in accordance with some implementations. In this illustrative example, an authentic image 490 is displayed that has been ascertained to be an authentic object.

This illustrative example depicts an example 3D virtual object (a shirt) created based on texture information provided via a set of 2D polygons. Specifically, a set of 2D polygons that include front torso 2D polygon 450 and right arm right side 2D polygon 460 based on a shirt template are provided, e.g., by a user that uploads a set of 2D polygons to define the 3D virtual object on the online gaming platform.

FIG. 4B depicts a side view of the virtual avatar and the 3D virtual object. As depicted, when the virtual avatar is viewed from a side, a combination of texture design features from polygons 450 and 460 in the particular pose (in which portions of 2D polygon 450 that appear on the torso combine with portion 460 of another 2D polygon that appears on the right arm) results in an appearance of an image 480 that is similar to the authentic image 490.

In this illustrative example, based on the comparison, it is determined that a texture associated with the received virtual 3D object that includes 2D polygons 450 and 460 is inauthentic based on its detected similarity with authentic object 490.

Figure 5A:
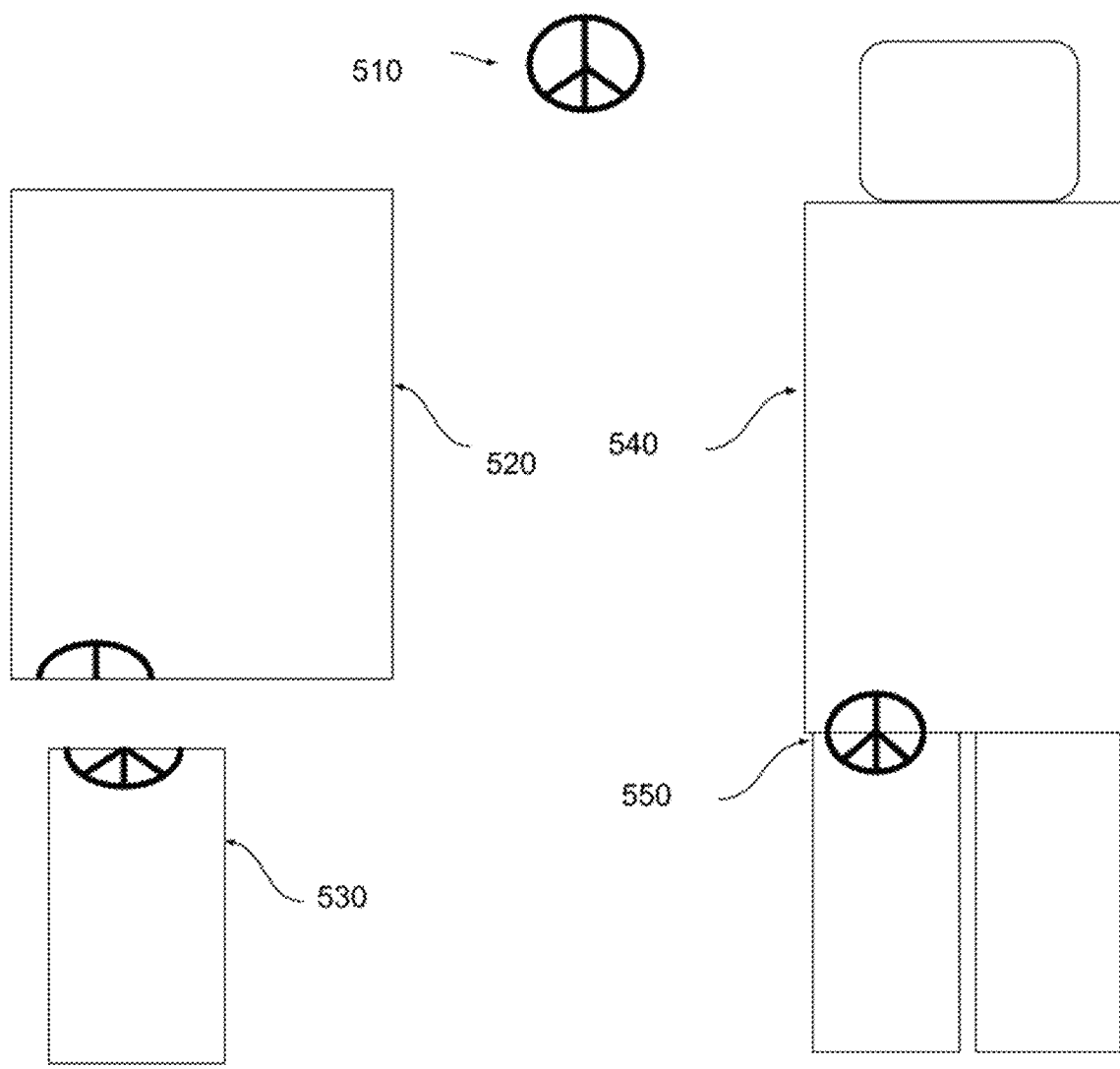
FIG. 5A illustrates views of a virtual avatar, in accordance with some implementations.

FIG. 5A illustrates views of a virtual avatar, in accordance with some implementations. In this illustrative example, an authentic image (object) 510 is displayed that has been ascertained to be an authentic object.

In some cases, a user can attempt to circumvent detection of inauthentic textures by distributing the inauthentic texture across multiple 3D virtual objects. This may cause a missed detection of an inauthentic texture when sets of 2D polygons, each associated with a respective 3D virtual object are verified. However, images and/or textures from different 3D virtual objects may combine when used together in a virtual environment to cause display of inauthentic (e.g. inappropriate and/or objectionable) content.

As an example, a user may create a first 3D virtual object, e.g., a shirt with a texture defined by a first set of 2D polygons. The user may additionally create a second 3D virtual object, e.g., a pant, with a texture defined by a second set of 2D polygons. In some cases, adjacent portions of the first 3D virtual object and the second 3D virtual object may combine to create/display inauthentic content.

For example, as depicted in FIG. 5A, a user may upload (provide) a set of 2D polygons that includes a 2D polygon 520 that specifies a texture associated with a front torso portion of a shirt. A second set of 2D polygons may be provided by the user that includes 2D polygon 530, which specifies a texture associated with a front leg portion of a set of pants.

Each of the individual 3D virtual objects, the shirt or the set of pants do not include textures that are inauthentic, e.g., do not match any previously received objects (images) that are classified as authentic, and could be classified as authentic textures when verified individually by the online gaming platform. However, when worn together in a virtual avatar, adjacent regions of the 3D virtual objects can create a view of an image that is inauthentic and matches an authentic object 510.

Detection of inauthentic textures that are generated by different 3D virtual objects is performed by evaluating a set of received 2D polygons associated with a 3D virtual object jointly with sets of 2D polygons associated with other 3D virtual objects and/or images stored on the online gaming platform. The evaluation considers likely poses and animation movements of a virtual avatar on which the 3D virtual objects are draped.

In this illustrative example, based on the comparison, it is determined that a texture associated with one or more of the received virtual 3D objects that include 2D polygons 520 and/or 530 is inauthentic based on a detected similarity of a combined 2D polygon (that combines polygons 520 and 530) that represents a view 550 with authentic object 510.

In some implementations, both the 3D virtual objects may be flagged for additional scrutiny and/or verification, e.g., by a human. In some implementations, where the texture is not established as a proprietary image, the authenticity may be assigned to an earlier received 3D virtual object.

In some implementations, where the texture is previously established as a proprietary image (e.g., a copyrighted image), the authenticity is assigned to a license holder of the proprietary image.

Figure 5B:
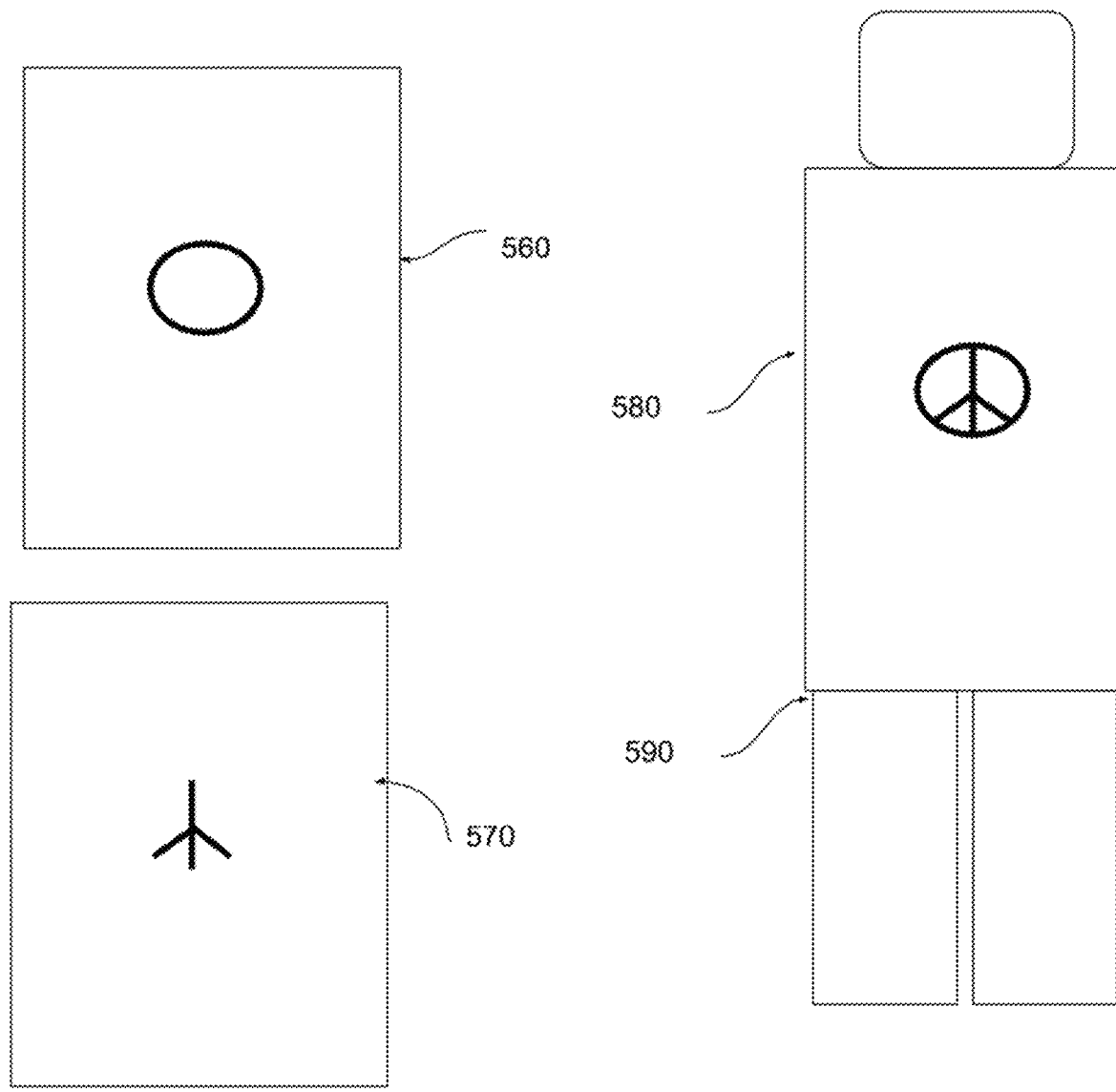
FIG. 5B illustrates views of a virtual avatar, in accordance with some implementations.

FIG. 5B illustrates views of a virtual avatar, in accordance with some implementations.

In some cases, 3D virtual objects can be used in combination with other objects. For example, a 3D virtual object such as a shirt for a virtual avatar (character) may be utilized in combination with another 3D virtual object such as a jacket for the virtual character in a virtual environment. As another example, a scarf may be utilized in conjunction with a shirt. 3D virtual objects may be specified to have any of various degrees of transparency.

For example, in FIG. 5B, 2D polygon 560 is included in a set of 2D polygons that are associated with a texture for a shirt, and 2D polygon 570 is a front torso portion 2D polygon included in a set of 2D polygons associated with a jacket that can be worn over the shirt. In this example, the jacket is specified to be transparent, and enables a view of a surface beneath the jacket, when worn by a virtual avatar.

As depicted in FIG. 5B, neither of the individual 3D virtual objects associated with 2D polygons 560 and 570, the shirt or the set of pants, includes textures that are inauthentic, e.g., do not match any previously received images that are classified as authentic, and may be classified as authentic textures when verified individually by the online gaming platform. However, when utilized (worn) together in a virtual avatar, the overlaid regions can cause display of a texture (image) that is inauthentic and matches an authentic object 510.

In this illustrative example, based on the comparison, it is determined that a texture associated with one or more of the received virtual 3D objects that include 2D polygons 560 and/or 570 is inauthentic based on a detected similarity of a combined 2D polygon (that combines 2D polygons 560 and 570) with authentic object 510.

Figure 6:
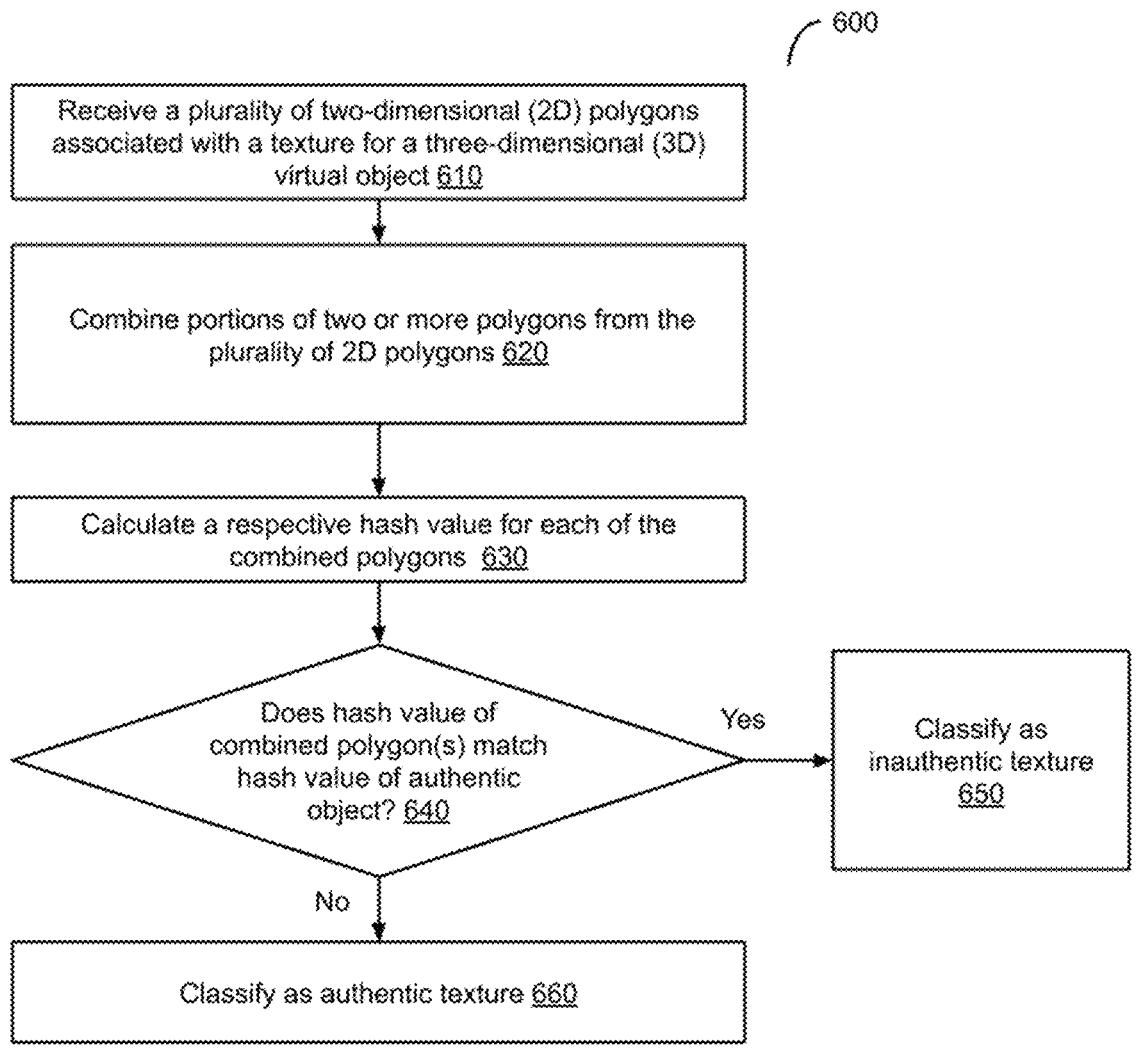
FIG. 6 is a flowchart illustrating an example method to detect inauthentic virtual objects, in accordance with some implementations.

FIG. 6 is a flowchart illustrating an example method 600 to detect inauthentic textures associated with virtual objects, in accordance with some implementations. In some implementations, method 600 can be implemented, for example, on gaming server 102 described with reference to FIG. 1. In some implementations, some or all of the method 600 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

Processing begins at 610, where a plurality of unauthenticated two-dimensional (2D) polygons associated with a texture for a three-dimensional (3D) virtual object are received. The 2D polygons associated with the texture for the virtual 3D object may be provided in a virtual 3D environment, such as a game 106, for utilization in the virtual 3D environment by one or more users. In some implementations, the texture for the virtual 3D object is generated by combining the plurality of 2D polygons in a specific arrangement based on a shape and/or pose of the 3D virtual object.

In some implementations, the plurality of unauthenticated 2D polygons may be received via upload to gaming server 102 by a developer using developer device 130.

In some implementations, the 3D virtual object may be an accessory or clothing item, e.g., shirt, pair of pants, a jacket, etc. associated with a virtual avatar that can be worn by a virtual avatar within a virtual environment such as a gaming environment or a social network environment.

In some implementations, the plurality of 2D polygons may include a set of rectangles that conform to a predefined template for a 3D virtual object. One or more predefined templates may be generated and shared with users and/or developers by the online gaming platform. The predefined template may define a set of polygons, e.g., rectangles, each of which are mapped to a particular part of a virtual character, e.g., front of torso, left side of left arm, right side of right arm, back of torso, etc. In some implementations, only a subset of 2D polygons associated with a texture may be received, and the remainder of the set of 2D polygons that are not received may be set to default values.

In some implementations, the 3D virtual object may be included as part of a set of game assets received from a developer. In some implementations, the 3D virtual object may be a standalone 3D virtual object that may be uploaded to the online gaming platform and subsequently used by one or more users, traded with one or more users, sold to one or more users for real or virtual currency, etc.

In some implementations, the unauthenticated virtual 3D object may include a user provided label that may serve as a descriptor of the virtual 3D object and/or the texture defined by a set of 2D polygons. For example, a label may indicate a name of the object, e.g., "cool shirt," "Batman costume," "Santa Claus pants" "cool jacket," etc. Block 610 may be followed by block 620.

At block 620, portions of two or more 2D polygons from the plurality of 2D polygons are combined to obtain one or more combined polygons.

In some implementations, the combination of portions of two or more 2D polygons is based on an ordered list of 2D polygons to be combined. In some implementations, the multiple ordered lists may be determined based on a superset of poses and/or animation movements compatible with a virtual character. In some implementations, the ordered lists may be stored in a storage device and/or a memory, for example, on data store 120, or on a local user or developer device. For example, the ordered list may be generated based on all 2D polygons that are likely to be adjacent and/or overlapping to one another in one or more camera views of a 3D virtual object.

In some implementations, each of the 2D polygons is sequentially combined with the remainder of the set of 2D polygons to generate a set of combined 2D polygons. In some implementations, the combination is also based on combining each of the set of 2D polygons with multiple angular transformation of the remainder of the set of 2D polygons. The angular combinations may be determined based on likely and physically feasible transformations of the corresponding portions, e.g., arm, leg, etc., for the 3D virtual object.

For example, a 2D polygon associated with a front torso portion of the 3D virtual object may be combined with a 2D polygon associated with a left arm front portion that takes into account all implementable (and viewable) angles of the left arm based on possible poses and/or movements of the virtual character (avatar) within the virtual environment.

In some implementations, the ordered list of 2D polygons utilized to combine portions or all of two or more 2D polygons is based on one or more poses of the 3D virtual object that are selected from a set of predetermined poses that are commonly observed and utilized in the virtual environment.

In some implementations, a 2D polygon that cannot appear adjacent to another 2D polygon in any possible pose or configuration may be excluded from being combined. For example, a 2D polygon associated with a front torso portion may be not be combined with a 2D polygon associated with a rear (back) torso portion since it may not be feasible for a simultaneous viewing of any portion of the respective 2D polygons in any of the possible views of a virtual avatar associated with the 3D virtual object.

In some implementations, the ordered list may also include weights associated with each corresponding set of 2D polygons in a respective combination of 2D polygons. The weights may be based on a relative likelihood of the 2D polygons in the combination to be adjacent or near adjacent in different camera views of the 3D virtual object within a virtual environment. Parameterized weighting of the different combinations of 2D polygons may be utilized, wherein some views are weighted differently from others. For example, views that may be more commonly viewed by a user (viewer) within a 3D environment may be weighted more than views that may be less common.

In some implementations, the ordered list may be based on a matrix of adjacent polygons as well as polygons that occur within a threshold distance (nearly adjacent) to one another in default and common poses of the avatar.

In some implementations, 2D polygons included in a set of 2D polygons associated with a texture of a 3D virtual object may be combined with 2D polygons from one or more sets of 2D polygons associated with textures of other 3D virtual objects that are previously received and stored in a storage device and/or a memory on the online gaming platform.

For example, a 2D polygon that is included in a set of 2D polygons associated with a shirt may be combined with a 2D polygon that is included in a set of 2D polygons associated with a texture of a pant that was received previously by the same or different user. As described earlier, the combination is determined based on 2D polygons that are likely to be adjacent in a camera view within the virtual environment. For example, a front torso portion 2D polygon may be combined with a front portion of 2D polygon associated with a right and/or left leg of a pair of pants, as described with respect to FIG. 5A.

In some implementations, 2D polygons included in a set of 2D polygons associated with a texture of a 3D virtual object may be combined with 2D polygons from one or more sets of 2D polygons associated with textures of other 3D virtual objects based on a transparency property of one or more 3D virtual objects and a likelihood of overlap of portions of 2D polygons from the respective 3D virtual objects. For example, a virtual avatar may utilize layered clothing, e.g. a jacket with transparent properties worn over a shirt. For accurate detection of inauthentic content in such a situation, a 2D polygon associated with a front torso portion of the shirt may be combined with a front torso portion of the jacket.

In some implementations, a history of combined 3D virtual objects (e.g. outfits) utilized on the online gaming platform may be used to determine a likelihood of combination of 3D virtual objects and may be utilized in determining sets of combinations of 2D polygons to be compared against authentic 3D virtual objects.

In some implementations, likely overlay arrangements of 2D polygons are previously determined, stored, and utilized to combine 2D polygons. In some implementations, the overlay arrangement is utilized for combination of 2D polygons of one or more 3D virtual objects when at least one of the one or more 2D polygons has a transparency that meets a threshold transparency.

In some implementations, combination of 2D polygons associated with a texture of a 3D virtual object is based on animated movements of a virtual avatar. In some implementations, an ordered list of animation sequences may be utilized and determined based on one or more animations in a virtual environment in which the 3D virtual object is placed, and wherein the one or animations correspond to movement of the 3D virtual object in the virtual environment.

The combination of respective 2D polygons is based on transformation, e.g. translocation, rotation, movement, etc. of the 3D virtual object that corresponds to animation of an associated virtual avatar. Where animation is implemented by a lattice deformation that deforms an underlying mesh used to define feature(s) of a virtual avatar, 2D polygons associated with a texture are correspondingly deformed. In some implementations, the deformation may be defined by predetermined functions that are applied to one or more 2D polygons before and/or after combination with other 2D polygons.

In some implementations, custom movements associated with the same developer and/or game associated with the 3D virtual object may be utilized to determine a set of combinations of 2D polygons.

In some implementations, subsequent to combination of two or more 2D polygons, the combined 2D polygon may be modified, e.g., cropped, etc. to generate a modified combined 2D polygon that further defines a preferred region of interest for verification of inauthentic content. For example, portions of a combined 2D polygon may be excluded based on a distance of those portions from an edge(s) of the overlap of the 2D polygons that were combined to generate the combined 2D polygon. For example, a modified 2D polygon may be generated from a combined 2D polygon that includes only areas of the combined 2D polygon that lie within a threshold distance from a center of the combined polygon.

Block 620 may be followed by block 630.

At block 630, a respective hash value is calculated for each of the one or more combined 2D polygons.

In some implementations, the hash value is calculated using a perceptual hash function. A perceptual hash function may be utilized to enable a determination of perceptual similarity of digital media content such as image files, animation, etc. Perceptual hash functions may be utilized to extract features of interest from the texture and calculate a hash value based on the features.

Perceptual hash functions may be designed such that a hash values (computed using a perceptual hash function) of an original object and an object to be authenticated are close when the objects are perceptually similar (for example, visually similar), and distant when the objects are perceptually dissimilar.

Block 630 may be followed by block 640.

At block 640, the hash values of the combined 2D polygons are compared to hash values of an authentic object in order to determine if the hash value of any of the combined 2D polygons match hash values of the authentic object.

For example, it may be determined whether there is a match between at least one hash value of the respective hash values of the 2D polygons and a hash value of at least one reference 2D polygon associated with an authentic object.

In some implementations, a hash value of each of the combined 2D polygons of the received virtual 3D object are compared to hash values of 2D polygons of objects, e.g. images, textures, etc. that are stored by the online gaming platform. As described earlier, in some implementations, parameterized weighting of the different views may be utilized, wherein some views are weighted differently from others. For example, views that may be more commonly viewed by a user (viewer) within a 3D environment may be weighted more than views that may be less common.

In some implementations, a match score associated with the match between each of the respective hash values and the hash value of the reference 2D polygon associated with an authentic object may be calculated. One or more weights associated with the combined portion of the two or more 2D polygons may be applied, where the weights are based on a likelihood of occurrence of the particular configuration of the virtual avatar represented by the combination of the 2D polygons. It may be determined that there is a match if the match score meets a predetermined threshold.

In some implementations, a match score may be based on a similarity of a match of a combined 2D polygon with a reference 2D polygon. For example, if a similarity is detected between a 2D polygon that corresponds to a particular location, e.g. outside left-arm, and a reference 2D polygon that also corresponds to the same location, a higher match score may be assigned.

In some implementations, a distance value between the respective hash value of the combined 2D polygons and the corresponding hash value of 2D polygons of authentic virtual 3D objects may be computed.

In some implementations, the distance value is compared against a predetermined distance threshold to determine whether the received texture associated with the virtual 3D object is similar to a texture of an authentic virtual 3D object. In some implementations, the distance threshold may be set to a value that is based on a category type of the received virtual 3D object. In some implementations, the distance threshold may be adjusted (for example, by gaming server 102) based on previously utilized distance thresholds and textures previously classified as authentic or inauthentic based on those distance thresholds.

In some implementations, the predetermined distance threshold may be configurable values. In some implementations, the predetermined distance threshold may be set to values that are based on a category type of the received virtual 3D object.

For example, certain object categories that are counterfeited more frequently or have greater sensitivity within the game platform may utilize thresholds where a smaller degree of similarity may result in the received virtual 3D object for those categories being flagged as inauthentic when compared to a received virtual 3D object that belongs to a category that is counterfeited less frequently. For example, shirts and pants are examples of virtual 3D objects that are counterfeited easily, often, and very quickly. Virtual 3D objects that involve less work to create and upload the content have a greater propensity to be copied.

In some implementations, a classification and/or a flagging of a received object may be based on a type or category of authentic object that it is determined to be similar to the received object. For example, similarity with logos and/or other copyrighted material may be completely impermissible, even if a single pose causes a match of a view of a received object with an authentic object. As another example, near-duplicate objects, as determined by a difference between respective hash values may be impermissible if at least a threshold number (e.g., percentage) of views of the object matched an authentic object.

If it is determined at block 640 that the hash value for the combined 2D polygons match hash values of the authentic object, block 640 is followed by block 650.

At block 650, the received virtual 3D object is classified as an inauthentic texture. In some implementations, the 3D virtual object determined to be inauthentic (counterfeit) may be excluded from a listing in a virtual platform (online gaming platform). In some implementations, a message indicating that the 3D virtual object was flagged as inauthentic (counterfeit) may be provided to the uploader and/or to an administrator of the virtual environment. In some implementations, the inauthentic object may be flagged for further review (for example, for a manual review by an administrator associated with the gaming platform).

If it is determined at block 640 that the hash value for the combined 2D polygons does not match hash values of the authentic object, block 640 is followed by block 660.

At block 660, the received virtual 3D object is classified as an authentic texture. In some implementations, the classification as a genuine object is used as a signal and combined with other signals (for example, manual review of 3D virtual objects, developer rating associated with the developer uploading the 3D virtual object, etc.) in order to classify the virtual 3D virtual object.

In some implementations, after classifying the unauthenticated virtual 3D object as the genuine 3D virtual object, the plurality of 2D polygons of the unauthenticated virtual 3D object may be stored in a storage device and/or a memory (for example, on data store 120), and utilized to authenticate other virtual 3D objects that may be received subsequently. The stored authentic 3D virtual object may be made available for use in a virtual environment. A user interface may be provided that includes the authentic texture and 3D virtual object in a virtual environment. Further, if the virtual environment enables users to buy genuine objects (e.g., by the payment of a virtual currency) or obtain access to genuine objects via a subscription, the authentic 3D virtual object (which is the unauthenticated 3D virtual object after classification at block 660) is made available to users.

Blocks 610-660 can be performed (or repeated) in a different order than described above and/or one or more steps can be omitted. For example, block 620 may be performed multiple times, e.g., to obtain subsets of combined 2D polygons based on a selected sequence. For example, a set of combined 2D polygons that are more likely to appear in a camera view may be generated at a first stage, and blocks 630-660 performed, and the process may be repeated at a subsequent stage with combined 2D polygons that are less likely.

In some implementations, received virtual 3D objects on the game platform may be scanned at a predetermined frequency (e.g., every day, every other day, every hour, etc.) to detect any inauthentic objects to mitigate user access to such objects. In some implementations, received virtual 3D objects that are more likely to be copied may be scanned at a higher frequency than virtual 3D objects that are less likely to be copied. In some implementations, method 600 may be performed each time a new object is received via upload. In some implementations, method 600 may be performed when a stored object is modified.

In some implementations, user feedback regarding inauthentic objects they encounter on the platform may be utilized to update the threshold distance and method 600 may be performed for one or more previously authenticated 3D virtual objects.

In some implementations, one or more detection parameters, e.g. matrix of adjacent polygons, threshold distance, ordered list, etc., may be updated (adjusted) based on detection of inauthentic 3D virtual objects.

In some implementations, the classification as a genuine object may be used as a signal and combined with other signals (for example, manual review of 3D virtual objects, developer rating associated with the developer uploading the 3D object, etc.) in order to classify the virtual 3D object.

In some implementations, after classifying the unauthenticated virtual 3D object as the genuine object, the hash values of the received 2D polygons and the combined 2D polygons may be stored (for example, on data store 120), and utilized to authenticate other virtual 3D objects that may be received subsequently.

In some implementations, prior to obtaining the one or more combined polygons at block 620, a hash value may be calculated for each of the received 2D polygons. A texture of a received unauthenticated 3D virtual object may be classified as an inauthentic texture if a hash value of at least one of the plurality of two-dimensional (2D) polygons associated with the texture for the 3D virtual object matches the hash value of a reference 2D polygon associated with an authentic object.

Figure 7:
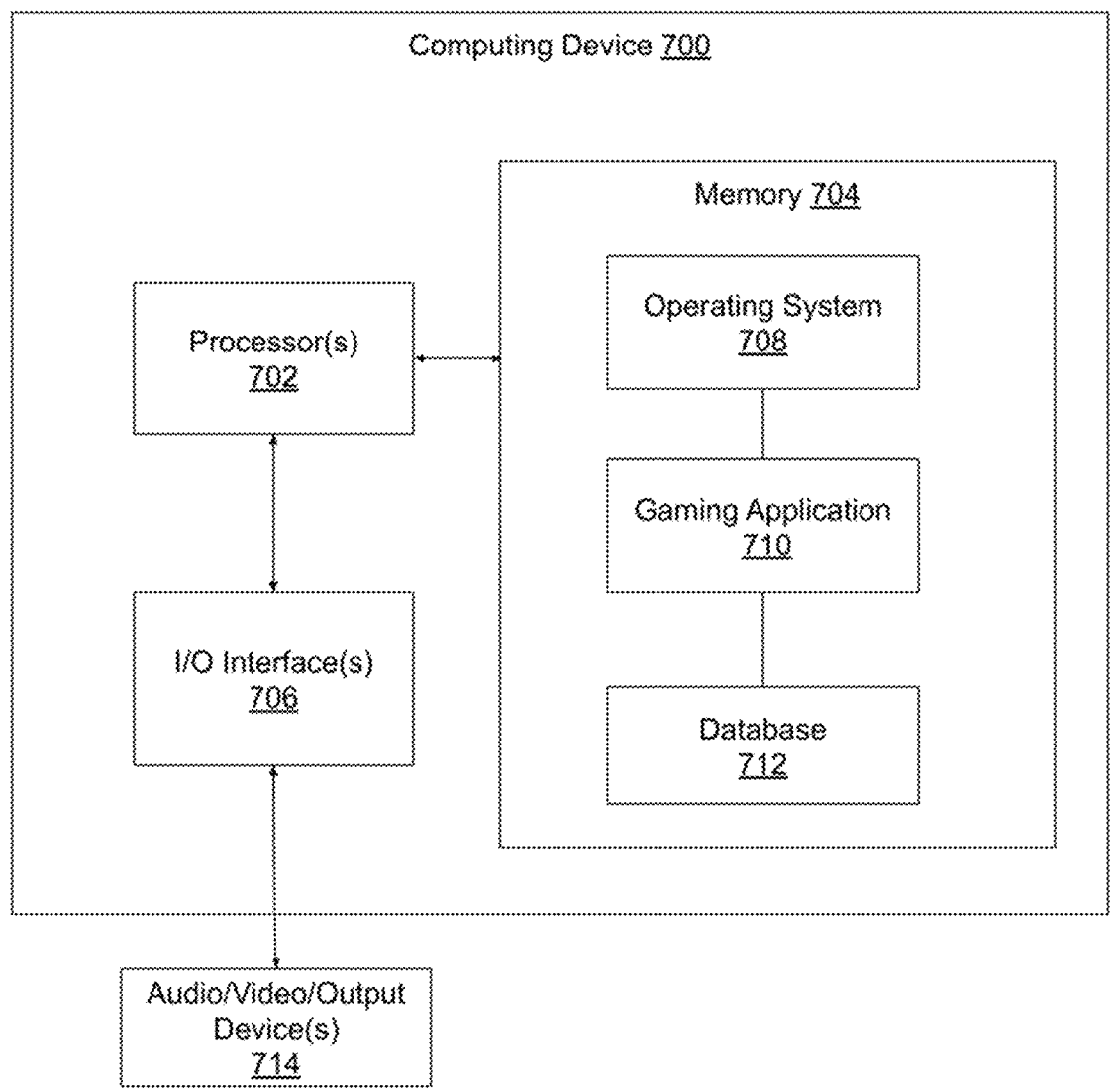
FIG. 7 is a block diagram illustrating an example computing device, in accordance with some implementations.

FIG. 7 is a block diagram of an example computing device 700 which may be used to implement one or more features described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application and application data 712. In some implementations, application 710 can include instructions that enable processor 702 to perform the functions (or control the functions of) described herein, e.g., some or all of the methods described with respect to FIG. 6.

For example, applications 710 can include an audio spatialization module 712, which as described herein can provide audio spatialization within an online gaming server (e.g., 102). Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks of operating system 708 and gaming application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to detect inauthentic textures in a virtual environment, the method comprising:
receiving, by a processor, a plurality of two-dimensional (2D) polygons associated with a texture for a three-dimensional (3D) virtual object;
combining, by the processor, portions of two or more 2D polygons from the plurality of 2D polygons based on a pose or shape of the 3D virtual object to obtain one or more combined 2D polygons;
calculating, by the processor, a respective hash value for each of the combined 2D polygons;
determining, by the processor, whether there is a match between at least one hash value of the respective hash values and a hash value of at least one reference 2D polygon associated with an authentic object;
if it is determined that there is the match, classifying the texture as an inauthentic texture; and
if it is determined that there is no match, classifying the texture as an authentic texture.

2. The computer-implemented method of claim 1, wherein receiving the plurality of 2D polygons comprises receiving a plurality of 2D polygons that include a set of 2D polygons that conform to a predetermined set of dimensions and are combinable based on a predetermined template to generate the texture for the 3D virtual object.

3. The computer-implemented method of claim 2, wherein the 3D virtual object is a clothing item associated with a virtual avatar.

4. The computer-implemented method of claim 1, wherein combining the two or more 2D polygons is based on an overlay arrangement of the two or more 2D polygons, and wherein at least one of the two or more 2D polygons has a transparency that meets a threshold transparency.

5. The computer-implemented method of claim 1, wherein determining whether there is the match comprises calculating a match score associated with the match between each of the respective hash values and the hash value of the reference 2D polygon associated with the authentic object; and determining that there is the match if the match score meets a threshold.

6. The computer-implemented method of claim 5, further comprising applying a weight associated with the combined portion of the two or more 2D polygons to the match score.

7. The computer-implemented method of claim 1, wherein combining portions of the two or more 2D polygons is based on an ordered list of 2D polygons.

8. The computer-implemented method of claim 7, further comprising determining the ordered list of 2D polygons based on one or more animations in the virtual environment in which the 3D virtual object is placed, and wherein the one or animations correspond to movement of the 3D virtual object in the virtual environment.

9. The computer-implemented method of claim 7, wherein the ordered list of 2D polygons is based on one or more deformations of the 3D virtual object.

10. The computer-implemented method of claim 1, further comprising, prior to the combining:
classifying the texture as the inauthentic texture if a hash value of at least one of the plurality of two-dimensional (2D) polygons associated with the texture for the 3D virtual object matches the hash value of the reference 2D polygon associated with the authentic object.

11. The computer-implemented method of claim 1, wherein calculating a respective hash value comprises calculating the respective hash value using a perceptual hashing technique, wherein hash values for polygons that have similar content bear greater similarity than hash values for polygons that have dissimilar content.

12. The computer-implemented method of claim 1, further comprising providing a user interface that includes the authentic texture in the virtual environment.

13. The computer-implemented method of claim 1, wherein the 3D virtual object is an object that can be worn by a virtual avatar in the virtual environment.

14. A non-transitory computer-readable medium comprising instructions that, responsive to execution by a processing device, causes the processing device to perform operations comprising:
receiving a plurality of two-dimensional (2D) polygons associated with a texture for a three-dimensional (3D) virtual object;
combining portions of two or more 2D polygons from the plurality of 2D polygons based on a pose or shape of the 3D virtual object to obtain one or more combined 2D polygons;
calculating a respective hash value for each of the combined polygons;
determining whether there is a match between at least one hash value of the respective hash values and a hash value of at least one reference 2D polygon associated with an authentic object;
if it is determined that there is the match, classifying the texture as an inauthentic texture; and
if it is determined that there is no match, classifying the texture as an authentic texture.

15. The non-transitory computer-readable medium of claim 14, wherein combining portions of the two or more 2D polygons is based on an ordered list of 2D polygons.

16. The non-transitory computer-readable medium of claim 15, wherein the operations further comprise determining the ordered list of 2D polygons based on one or more animations in a virtual environment in which the 3D virtual object is placed, and wherein the one or animations correspond to movement of the 3D virtual object in the virtual environment.

17. A system comprising:
a memory with instructions stored thereon; and
a processing device, coupled to the memory, the processing device configured to access the memory and execute the instructions, wherein the instructions cause the processing device to perform operations including:
receiving a plurality of two-dimensional (2D) polygons associated with a texture for a three-dimensional (3D) virtual object;
combining portions of two or more 2D polygons from the plurality of 2D polygons based on a pose or shape of the 3D virtual object to obtain one or more combined 2D polygons;
calculating a respective hash value for each of the combined polygons;
determining whether there is a match between at least one hash value of the respective hash values and a hash value of at least one reference 2D polygon associated with an authentic object;
if it is determined that there is the match, classifying the texture as an inauthentic texture; and
if it is determined that there is no match, classifying the texture as an authentic texture.

18. The system of claim 17, wherein combining portions of the two or more 2D polygons is based on an ordered list of 2D polygons.

19. The system of claim 18, wherein the ordered list of 2D polygons is based on one or more deformations of the 3D virtual object.

20. The system of claim 17, wherein calculating a respective hash value comprises calculating the respective hash value using a perceptual hashing technique, wherein hash values for polygons that have similar content bear greater similarity than hash values for polygons that have dissimilar content.

* * * * *